(12) United States Patent
Koopmann et al.

(10) Patent No.: US 11,566,973 B2
(45) Date of Patent: Jan. 31, 2023

(54) PIPE SECTION HAVING A TEMPERATURE SENSING PIPE LINER FOR MEASURING TEMPERATURE, AND A METHOD FOR MEASURING PUMP EFFICIENCY

(71) Applicant: KCF TECHNOLOGIES, INC., State College, PA (US)

(72) Inventors: Gary H. Koopmann, Alexandria, VA (US); Jacob J. Loverich, State College, PA (US)

(73) Assignee: KCF TECHNOLOGIES, INC., State College, PA (US)

( * ) Notice: Subject to any disclaimer, the term of this patent is extended or adjusted under 35 U.S.C. 154(b) by 530 days.

(21) Appl. No.: 16/364,176

(22) Filed: Mar. 25, 2019

(65) Prior Publication Data

US 2019/0391050 A1 Dec. 26, 2019

Related U.S. Application Data

(60) Provisional application No. 62/647,324, filed on Mar. 23, 2018.

(51) Int. Cl.
*G01K 13/00* (2021.01)
*G01M 99/00* (2011.01)
*F04B 51/00* (2006.01)
*G01K 13/02* (2021.01)

(52) U.S. Cl.
CPC ........... *G01M 99/002* (2013.01); *F04B 51/00* (2013.01); *G01K 13/02* (2013.01); *G01M 99/005* (2013.01); *G01K 13/026* (2021.01)

(58) Field of Classification Search
CPC .......... G01K 13/02; G01K 13/00; G01K 1/08; G01K 13/026; G01M 3/3236

USPC ......................................... 374/147, 148, 143
See application file for complete search history.

(56) References Cited

U.S. PATENT DOCUMENTS

| 3,370,542 | A | * | 2/1968 | Harney | G01K 13/02 |
| | | | | | 415/47 |
| 3,373,099 | A | * | 3/1968 | Kennedy | B01J 19/08 |
| | | | | | 204/171 |
| 3,453,865 | A | * | 7/1969 | Reiter | G01N 25/72 |
| | | | | | 374/33 |
| 4,774,838 | A | * | 10/1988 | Rickson | G01F 23/22 |
| | | | | | 73/295 |

(Continued)

FOREIGN PATENT DOCUMENTS

| CN | 201016518 Y | * | 2/2008 |
| CN | 202515774 U | * | 11/2012 |

(Continued)

*Primary Examiner* — Gail Kaplan Verbitsky
(74) *Attorney, Agent, or Firm* — MH2 Technology Law Group LLP

(57) ABSTRACT

A system for measuring pump efficiency includes a pump configured to pump a fluid, a suction pipe disposed upstream of a suction side of the pump, a discharge pipe disposed downstream of a discharge side of the pump, a first pipe section disposed between the suction pipe and the suction side of the pump, and a second pipe section disposed between the discharge pipe and the discharge side of the pump. Each of the first pipe section and the second pipe section includes a temperature sensing pipe liner configured to measure a temperature of the fluid in the first pipe section, and a thermal insulator disposed radially outward of the temperature sensing pipe liner.

29 Claims, 10 Drawing Sheets

(56) References Cited

U.S. PATENT DOCUMENTS

| | | | | |
|---|---|---|---|---|
| 5,010,440 | A | * | 4/1991 | Endo .................... B29C 53/382 |
| | | | | 138/97 |
| 5,304,003 | A | * | 4/1994 | Winninger ............... G01K 1/06 |
| | | | | 374/150 |
| 5,668,529 | A | * | 9/1997 | Kyrtsos ................ F16D 66/021 |
| | | | | 374/135 |
| 6,604,854 | B1 | * | 8/2003 | Limburg .............. G01K 11/165 |
| | | | | 116/207 |
| 6,691,823 | B2 | * | 2/2004 | Lee .................... F04B 39/0061 |
| | | | | 181/221 |
| 8,940,113 | B2 | * | 1/2015 | Lindner ................. B32B 37/10 |
| | | | | 156/64 |
| 9,523,525 | B2 | * | 12/2016 | Nakai ................... F25B 49/005 |
| 9,849,625 | B2 | * | 12/2017 | Kiest, Jr. ............. B29C 63/0004 |
| 2002/0034212 | A1 | * | 3/2002 | Faries, Jr. ............ G01K 11/12 |
| | | | | 374/150 |
| 2012/0170610 | A1 | * | 7/2012 | Ramos .................... G01M 3/28 |
| | | | | 374/5 |
| 2017/0146265 | A1 | * | 5/2017 | Fujitaka ................ C09K 5/045 |

FOREIGN PATENT DOCUMENTS

| | | | | | |
|---|---|---|---|---|---|
| CN | 105035573 | A | * | 11/2015 | |
| CN | 205747468 | U | * | 11/2016 | |
| CN | 206033840 | U | * | 3/2017 | |
| CN | 206648160 | U | * | 11/2017 | |
| CN | 207019373 | U | * | 2/2018 | |
| CN | 207335154 | U | * | 5/2018 | |
| CN | 208671337 | U | * | 3/2019 | |
| CN | 210487482 | U | * | 5/2020 | |
| DE | 10136738 | A1 | * | 2/2003 | ............. G01K 1/143 |
| JP | 10193457 | A | * | 7/1998 | ............. F16L 58/02 |
| JP | 2002001818 | A | * | 1/2002 | |
| JP | 2012159179 | A | * | 8/2012 | |
| WO | WO-2009135504 | A1 | * | 11/2009 | ........... G01N 17/008 |

\* cited by examiner

PIPE SECTION HAVING A TEMPERATURE SENSING PIPE LINER FOR MEASURING TEMPERATURE, AND A METHOD FOR MEASURING PUMP EFFICIENCY

CROSS-REFERENCE TO RELATED APPLICATION

This nonprovisional application claims the benefit of U.S. Provisional Application No. 62/647,324, filed Mar. 23, 2018. The disclosure of the prior application is hereby incorporated by reference herein in its entirety.

BACKGROUND

This disclosure relates generally to pumping systems and, more particularly, to a pipe section having a temperature sensing pipe liner for measuring pump efficiency, and a method for measuring pump efficiency.

There is a great need for improving energy efficiency in pump operations, since it known that the average pump operates at an efficiency well below 50%. Pumping systems account for nearly 40% of the world's electrical energy demand and range from 25-50% of the energy usage in certain industrial plant operations. Pumping systems are widespread; they provide domestic services, commercial and agricultural services, municipal water/wastewater services, and industrial services for food processing, chemical, petrochemical, pharmaceutical, and mechanical industries. The energy cost is the largest element in the total cost of owning a pump (~40%). Depending on the industry, centrifugal pumps consume between 25% and 60% of a plant's electrical motor energy.

Pumps vary in size from a few kilowatts to several megawatts and operate between efficiencies of 30 and 90 percent. FIG. 1 shows an example of an efficiency curve and pressure relative to flow through a pump. A poorly selected pump or a pump that does not run at its optimum design duty point is a classic symbol of wasted energy. A pump operating away from its duty point badly affects the life of its seals, bearings, wear rings and shaft. The radial forces in the pump are lowest at the duty point and increase with the shifting of the operating point on either side of it. An improperly balanced pumping system results in higher operating costs. Consequently, measuring pump efficiencies directly becomes critical to determine the energy savings potential and also to assess the asset condition.

With accurate and reliable knowledge of the actual performance of pumps, information is available to support changes in the way existing pumps are operated, including their scheduling, utilization and combinations. This can be a very cost-effective way of reducing energy costs with minimal investment required and, based on the results of the monitoring, there is ample room to consider such operational improvements with positive effect.

Also, monitoring a pump's efficiency before and after refurbishments show encouraging results, with the recovery of lost efficiency—measured as the difference between peak manufacturer efficiency and peak field efficiency before refurbishment—commonly in the range of 50 to 70 percent, depending on specific circumstances. Thus, sufficient information can be made available via pump efficiency measurements to construct credible business cases supporting the refurbishment of pumps.

Two methods are available for measuring pump performance and efficiency: a conventional (or legacy) method and a thermodynamic method. Each method, when applied under the right conditions can yield accurate and reliable methods. Both methods measure the pressure differentials between the suction and discharge side of the pump along with input power to the pump motor. In the conventional method, it is also necessary to measure the pipe flow directly to complete the efficiency calculation. In reality, such a measurement is often problematic since piping configurations surrounding pumps are often not ideal.

On the other hand, in the thermodynamic method, the need for a flow measurement is averted. Instead of a flow measurement, the temperature gain in the fluid across the pump is measured which is directly related to the energy lost due to the pump's inefficiency. When comparing the two methods, the thermodynamic method has earned the reputation of being the more accurate of the two, since the flow measurement associated with the conventional method is often prone to inaccuracies. However, the thermodynamic method does require calibrated temperature probes that allow measurements of temperature differentials to within a few mK's. (Note that this stringent requirement relates to temperature differentials and not accuracy.) However, with combining advanced sensors (e.g., thermistors) with integrated circuits for linearizing outputs, there are now straightforward means for high precision temperature measurements.

In traditional pumping systems that use the thermodynamic method for measuring pump performance and efficiency, temperature probes are inserted directly into the flow before entering and after leaving the pump. However, when encountering flow conditions where the fluid entrains particulates (e.g., slurries or wood pulp), the presence of a probe that protrudes into the flow is problematic. In these cases, the particulates get caught on the probe's surface affecting its calibration. Further, as the particulates accumulate on the probe, its drag increases. The resultant induced vibration eventually causes fatigue at the base of the probe's tube and failure occurs. Similar behavior may even occur on a probe in clean flow whereby the unsteady forces due to vortex shedding along the probe's tube excites the probe into a 'locked-in' vibration, ultimately leading to its failure.

Therefore, it is desirable to provide an apparatus for measuring the temperature of a moving fluid in a pipe that is non-invasive and thus does not influence or alter the flow of fluid. It may also be desirable to provide an apparatus for measuring the temperature of a moving fluid in a pipe that provides more than the single point measurement of a probe. It may also be desirable to provide an apparatus for measuring the temperature of a moving fluid that contains mixed particulates, highly corrosive fluids, and/or highly abrasive fluids and/or that requires hygienic surfaces.

BRIEF DESCRIPTION OF THE DRAWINGS

For a further understanding of the disclosure, reference will be made to the following detailed description of the invention which is to be read in connection with the accompanying drawing and in which like numbers refer to like parts, wherein.

DETAILED DESCRIPTION OF EMBODIMENTS

Figure 1:
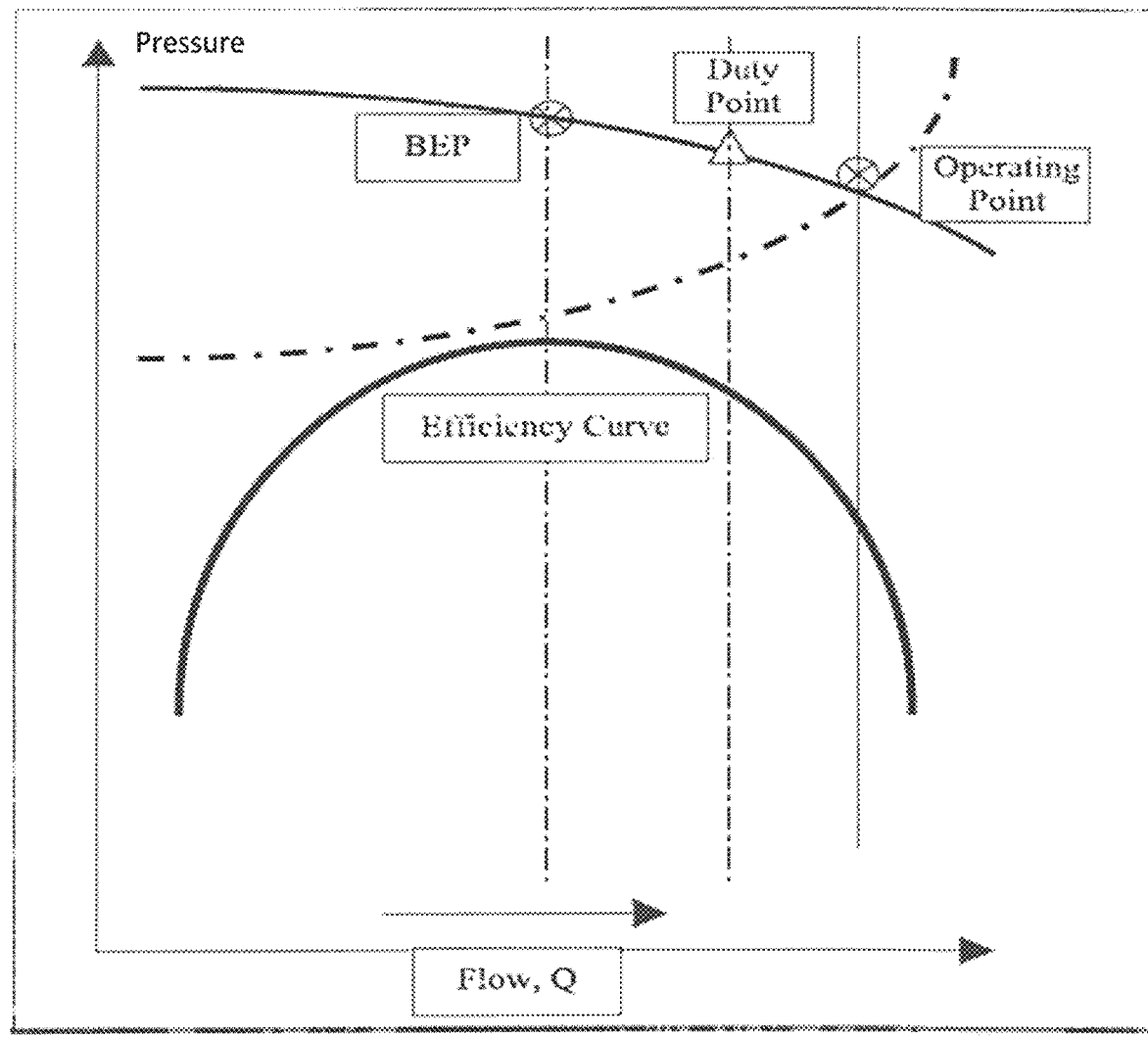
FIG. 1 is a graph showing an example of an efficiency curve and pressure relative to flow through a pump.

As a preface to the detailed description, it should be noted that, as used in this specification and the appended claims, the singular forms "a", "an," and "the" include plural referents, unless the context clearly dictates otherwise Conventional pump efficiency measurement requires three data points: (1) fluid rate (Q, m³/s); (2) pressure difference between the suction and discharge (ΔP, Pa); and (3) power input to the pump motor (I,W), as expressed with Equation (1) below:

$$\text{Efficiency} = \frac{\Delta P \times Q}{I \times \eta_{motor}} \quad (1)$$

where $\eta_{motor}$ is the efficiency of the pump motor.

The thermodynamic method for measuring pump efficiency was developed in the early 1960s, and since has been increasingly used. It is described in high precision hydraulic testing standards such as ISO 5198. The thermodynamic method of pump efficiency testing is based on the evaluation of energy, per unit mass of the liquid, received by the liquid via the pump shaft, by measurements of the differential head and differential temperature across the pump using the thermodynamic properties of the liquid. The hydraulic efficiency of a pump is defined as the ratio of the hydraulic power output of the pump and the mechanical power input to the impeller (via the shaft) is given by Equation (2) below:

$$\eta_h = \frac{P_h}{P_m} = \frac{E + E_m}{E_m} \quad (2)$$

where
$\eta_h$=overall efficiency of pump
$P_h$=hydraulic power output of pump in W
$P_m$=mechanical power input to the impeller in W E, the specific hydraulic energy is the hydraulic energy/unit mass in units of J/kg. The specific energy of the fluid available between the suction and discharge sides of the pump (taking into account the effect of compressibility) is given by Equation (3) below:

$$E = \frac{P_1 - P_2}{\rho} + \frac{V_1^2 - V_2^2}{2} + g(Z_1 - Z_2) \quad (3)$$

where
ρ=average value of density of fluid (P,T) in kg/m³
$P_1,P_2$=absolute pressure in Pa
$V_1,V_2$=velocity in m/s
g=acceleration due to gravity in m/s²
$Z_1,Z_2$=geodetic head in m
Indices 1 & 2 indicate the discharge and suction side pressure respectively $E_m$ is the specific mechanical energy per unit mass in unit of J/kg. It is also defined as the mechanical power transmitted through the coupling/shaft of the pump per unit mass flow and is given by Equation (4) below:

$$E_m = a(P_1 - P_2) + C_p(\theta_1 - \theta_2) + \frac{V_1^2 - V_2^2}{2} + g(Z_1 - Z_2) \quad (4)$$

where
a=isothermal factor of fluid in kg/m³
$C_p$=specific heat of fluid in J/kg/K
$P_1,P_2$=absolute pressure in Pa
$\theta_1,\theta_2$=temperature in K
$V_1,V_2$=velocity in m/s
g=acceleration due to gravity in m/s²
$Z_1,Z_2$=geodetic head in m
Indices 1 & 2 indicate the discharge and suction side pressure respectively Assuming that the suction and discharge side of the pump have the same velocities and are at the same elevation, and making the necessary substitutions in the equation for efficiency gives Equation (5) below:

$$\eta_h = \frac{\frac{P_1 - P_2}{\rho}}{\frac{P_1 - P_2}{\rho} + C_p(\theta_1 - \theta_2)} \quad (5)$$

Thus, by measuring the temperature and pressure differentials across the suction and discharge side of a pump, its efficiency can be computed directly.

As set forth above, $C_p$ is the specific heat capacity and ρ is the fluid density. These are known for the fluid (e.g., ISO 5198 Tables for water). For slurries, the fractions of liquids and solids must also be known. These can be calculated from the slurry and solids densities.

Figure 2:
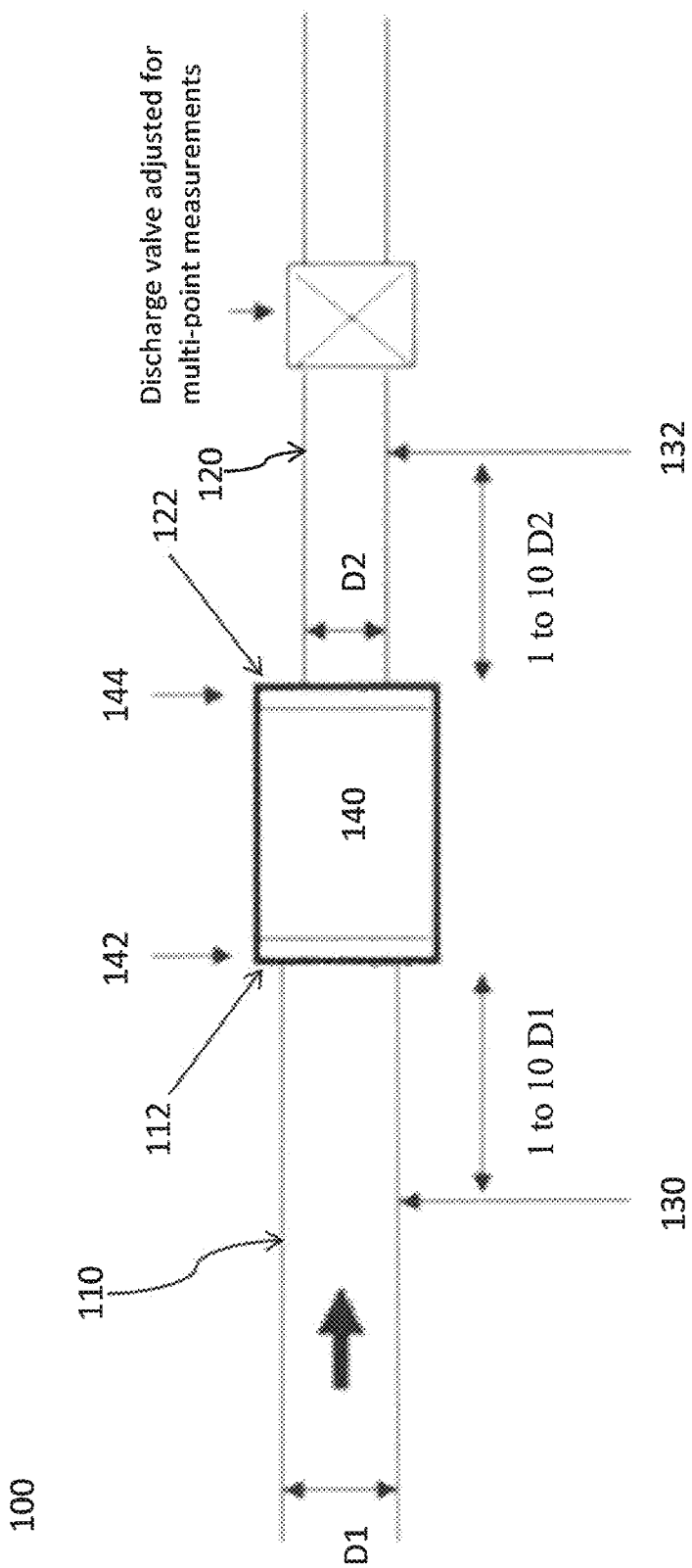
FIG. 2 is a diagrammatic illustration of a typical pumping system.

Referring now to FIG. 2, a conventional pumping system 100 is illustrated. The conventional pumping system 100 includes a suction pipe 110 that directs a flow of fluid to a pump 140 and a discharge pipe 120 that receives the flow of fluid from the pump 140. As shown in FIG. 2, the suction pipe 110 has diameter D1 and the discharge pipe 120 has a diameter D2. The pump 140 includes flanges 142, 144 at the suction and discharge sides of the pump 140 that are coupled with a flange 112 of the suction pipe 110 and a flange 122 of the discharge pipe 120, respectively. A first probe 130 and a second probe 132 are disposed directly in the flow of the suction pipe 110 and the discharge pipe 120, respectively. The first probe 130 is disposed upstream of the pump 140 by a distance that is 1 to 10 times the diameter D1 of the suction pipe 110, and the second probe 132 is disposed downstream of the pump 140 by a distance that is 1 to 10 times the diameter D2 of the discharge pipe 120. The first and second probes 130, 132 include sensors for sensing fluid pressure and fluid flow rate.

With the conventional pumping system and method for measuring pump efficiency, on-site constraints often make it difficult to accurately measure pump efficiency under installed conditions by the same method that pump manufacturers traditionally use for works tests. As noted above, in the conventional method, pump efficiency is calculated from direct measurements of flow rate, head (pressure), and input power to the driving engine. Of these parameters, all except flow rate are also common to the thermodynamic method. However, flow rate is the most difficult to determine accurately, and many pumps do not have accurate, individual flow meters, which are high-cost items, especially for larger diameter pipes, and can be difficult or impossible to install, maintain, and carry out calibration checks on-site. Furthermore, flow meter accuracy can be dependent on installed pipe lengths prior to and after the measuring device, the pump's operating point, and other factors, such as the build-up of debris in pipes or on sensors, or cavitation and air entrainment. Often, only the total flow from a station, or from each group of pumps is measured, so there is no information on how each pump of the station or the group of pumps is performing, and which pumps require attention. Also, pipe installations are sometimes compromised in the interest of minimizing costs. Conventional flow meters are likely to have an installed uncertainty of 5 to 10%, and this will lead to a corresponding uncertainty in the pump efficiency measurement, a potential error so large that it is impracticable for pump refurbishment or system control decisions. However, using the best of techniques, the flow measurement accuracy—using a non-intrusive, ultrasonic flow meter (USFM)—is bound to be less than ±5 percent in the field. This can be improved by increasing the number of passes with a USFM or permanently installing a magnetic flow meter in the line. Both of these techniques, however, are not justified as the former makes the efficiency evaluation too costly while the latter requires pipeline modification (cutting the pipe and installing the magnetic flow meter) for permanent installation.

Figure 3:
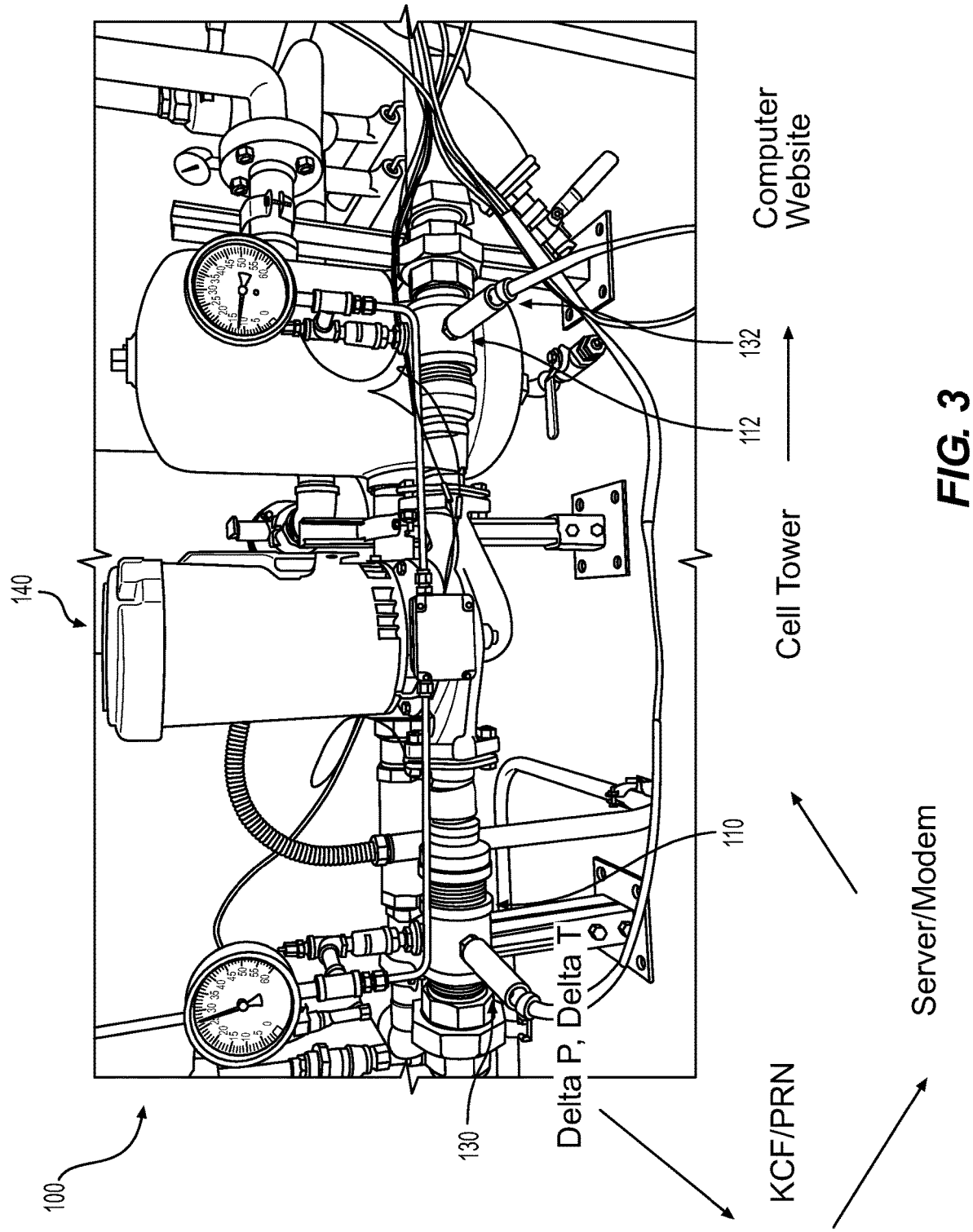
FIG. 3 is a photograph of a typical pumping system.

As discussed above, in the thermodynamic method, the need for a flow measurement is averted. The inefficiency of pumps is transmitted through the medium of temperature, and thus nearly all of the energy lost due to the inefficiency of a pump causes an increase in temperature of the fluid that is being pumped. The thermodynamic method takes advantage of this fact, and precisely measures the temperature difference across a pump to calculate the pump's efficiency. Pressure measurements are used to calculate the head of the pump and, as an option when needing to calculate flow rate, a power meter is used to measure input power to the pump. The temperature measurement is critical and consequently commercial distributors of thermodynamic pump testing equipment often quote an accuracy of greater than 0.001° C. Such accuracy is necessary as the temperature rise across a pump may be less than 0.05° C. Typically, temperature probes are inserted directly into the flow and pressure measurements are taken from taps on both the suction and discharge sections of the pipe, as illustrated in FIG. 3. FIG. 3 is a photo of a Bell & Gossett 90 series circulation pump with 1½ hp at nominal operating condition (i.e., 30 gpm at 85 ft head) used in a pumping system. Also shown in the photo are two combination temperature and pressure sensor probes installed near the suction and discharge sides of the pump.

Another key difference between the conventional method and the thermodynamic method for measuring pump efficiency is test setup requirements. The conventional method requires more stringent piping requirements usually requiring greater than 5 diameters (i.e., 5×D1) of straight pipe upstream of the flow meter to provide the quoted flow accuracy. The thermodynamic method, however, typically requires only 1-2 diameters (i.e., 1×D1 to 2×D1) of straight pipe upstream of the equipment to achieve quoted accuracies. Consequently, the thermodynamic method is often able to perform field tests that cannot be performed by a conventional test.

The thermodynamic method can be used to assess the performance of pumps for preventative maintenance and to inform replacement and refurbishment decisions. Further, the thermodynamic method can be used for performance testing of pumps, flow meter calibration, system curve tests, and other applications. The thermodynamic method is capable of achieving results with uncertainties of less than 1% in pump efficiency and less than 1.5% in flow rates while being able to test piping configurations where other conventional pump testing methods cannot provide accurate results.

Use of the thermodynamic method to measure pump efficiency is well known. However, as discussed above, when encountering flow conditions where the fluid entrains particulates (e.g., slurries or wood pulp), the presence of the probes 130, 132 that protrude into the flow through the suction and discharge pipes is problematic. In these cases, the particulates can get caught on the probes' surface affecting their calibration. Further, as the particulates accumulate on the probes, their drag increases. The resultant induced vibration eventually causes fatigue at the base of the probes' tube, and probe failure occurs. Similar behavior may even occur on the probes in clean flow whereby the unsteady forces due to vortex shedding along the probes' tube excites the probes into a 'locked-in' vibration, ultimately leading to their failure.

Figure 4:
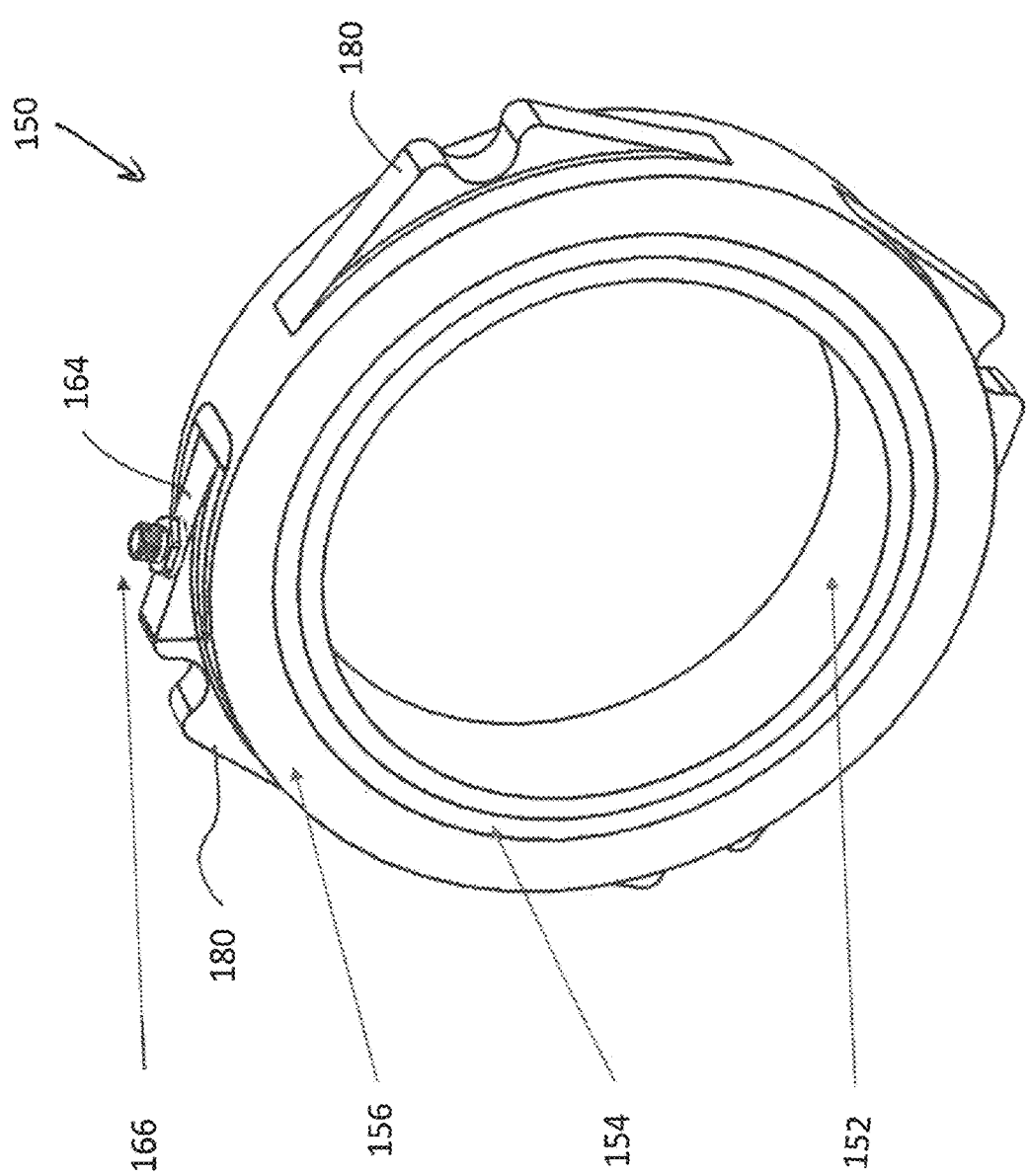
FIG. 4 is a perspective view of an exemplary pipe section having a temperature sensing pipe liner in accordance with various aspects of the disclosure.
Figure 5:
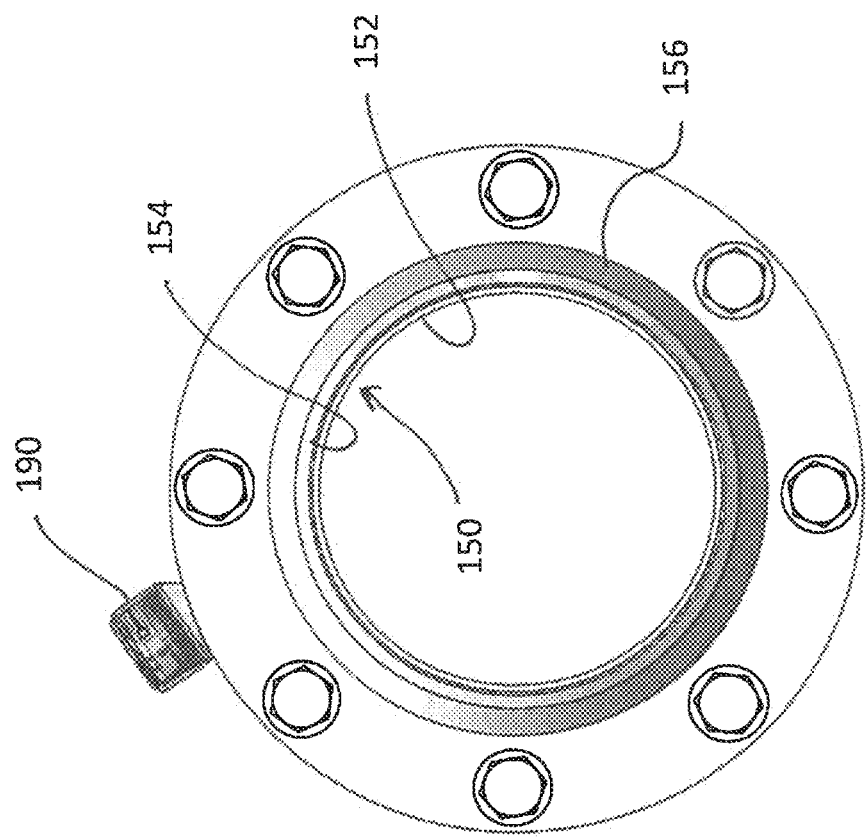
FIG. 5 is a front view of the exemplary pipe section of FIG. 4.

Referring now to FIGS. 4-8, in order to circumvent these aforementioned problems associated with the probes protruding into the flow through the suction and discharge pipes, an exemplary pipe section 150 includes a temperature sensing pipe liner 152 for measuring the temperature of a moving fluid in a pipe is disclosed, a thermal insulator 154, and a flange portion 156. As shown in FIGS. 4 and 5, the liner 152 may be configured as an annular inner lining of a thin material having high thermal conductivity in the range of 100-200 W/mK, for example, beryllium copper, such that the liner 152 assumes the temperature of the fluid passing over it. The materials for the inner liner 152 can include thin metals and/or ceramics and may be inserted as an annular liner or deposited on the thermal insulator 154 with a variety of conventional deposition methods, including, but not limited to, sputtering, spraying, etc. It should be appreciated, the inner liner 152 can be made of a material that is capable of providing measurements in flows containing highly corrosive fluids (e.g., acids) and highly abrasive fluids (e.g., sand slurries). In some aspects, inner liner 152 can be made of a material that is capable of providing measurements in flows that require hygienic surfaces, e.g., transporting food stuffs, pharmaceuticals, etc. Similar processes can be used for inserting or depositing the insulator 154 on the flange portion 156.

As shown in FIGS. 4 and 5, the thermal insulator 154 is disposed between the liner 152 and the flange portion 156. The thermal insulator 154 may be an annular layer of a chemically inert, structurally stable material, for example, a polymer, that has low thermal conductivity in the range of 10-20 W/mK.

Figure 6:
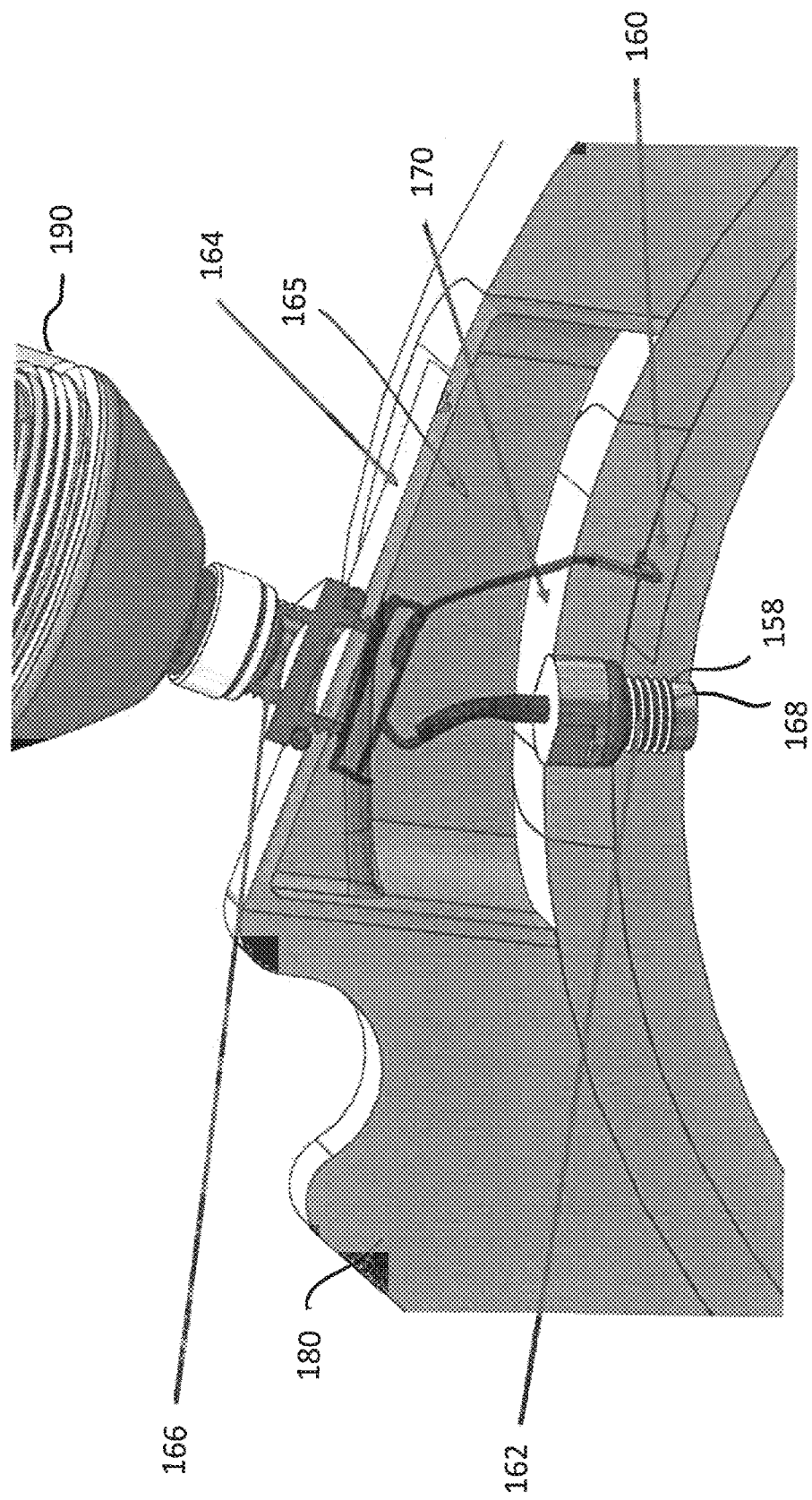
FIG. 6 is an enlarged cutaway perspective view of a portion of the exemplary pipe section of FIG. 4.

Referring now to FIG. 6, the pipe section 150 includes temperature transducer 160, a pressure transducer 162, and a communication interface 166. The temperature transducer 160 (e.g., a thermistor) is placed on the inner liner 152 to provide a spatially-averaged measure of the temperature of the inner liner 152. In some aspects, the pipe section may include more than one temperature transducer 160. The temperature transducer 160 may be, for example, an Omega SA1-RTD surface mount thermal device, and the pressure transducer 162 may be, for example, an Omega PX600 Subminiature pressure transducer with flush (sealed) diaphragm. The temperature transducer 160 and the pressure transducer 162 may be housed in an enclosure 165 closed by, for example, a molded electronics cover 164. The cover 164 may be removably coupled with the flange portion 156 to provide access to an enclosure 165 configured to house the wiring connections between the temperature transducer 160, the pressure transducer 162, and the communication interface 166. In some aspects, the communication interface 166 may be an external connector for a wireless communication node 190, for example, a node (e.g., a receiver) of Applicant's machine health monitoring system, which is described in U.S. patent application Ser. No. 15/156,311 (Publication No. 2016/0370259), the disclosure of which is incorporated herein by reference. The communication interface 166 may be configured to support direct or remote connections.

The pressure transducer 162 may include a threaded portion 168 configured to be received by a threaded opening 158 in the inner liner 152. The temperature transducer 160 and the pressure transducer 162 may be surrounded by fluid-tight, electrically and thermally isolating potting fill 170, for example, structural epoxy, silicone, etc.

The flange portion 156 is a material selected to support mating flange seal pressure. The flange portion 156 includes radially outward projections 180 that are structured and arranged to align with fasteners, for example, bolts, that mechanically couple a pair of additional flanges to one another. The flange portion 156 and the radially outward projections 180 are structured and arranged to center the pipe section 150 in pipe flow and minimize rotation of the flange portion 156 with other connected flange portion in order to provide for reliable location with minimal manufacturing and installation complexity.

Figure 7:
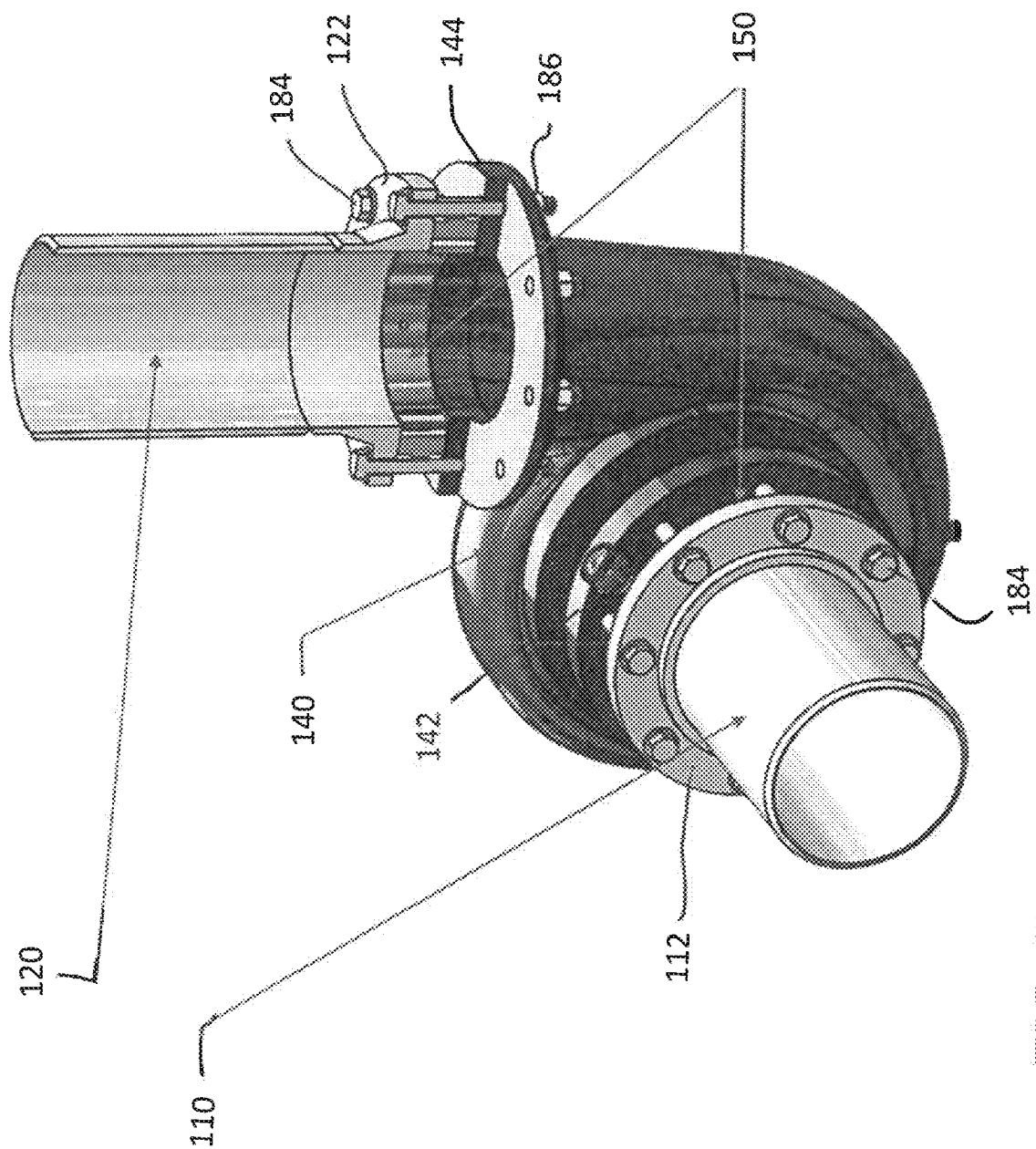
FIG. 7 is a perspective view of a pumping assembly that includes the exemplary pipe section of FIG. 4.

Referring now to FIG. 7, one of the pipe sections 150 is mounted between the flange 112 of the suction pipe 110 and the flange 142 at the suction side of the pump 140, and another one of the pipe sections 150 is mounted between the flange 122 of the discharge pipe 120 and the flange 144 at the discharge side of the pump 140. The flange 112 of the suction pipe 110 is coupled with the flange 142 at the suction side of the pump 140 via fasteners, for example, bolts 184 and nuts 186. As discussed above, the radially outward projections 180 of the flange portion 156 cooperate with the fasteners 184, 186 to center and minimize rotation of the pipe section 150. Similarly, the flange 122 of the discharge pipe 120 is coupled with the flange 144 at the discharge side of the pump 140 via fasteners 184, 186, and the radially outward projections 180 of the flange portion 156 cooperate with the fasteners 184, 186 to center and minimize rotation of the pipe section 150.

Figure 8:
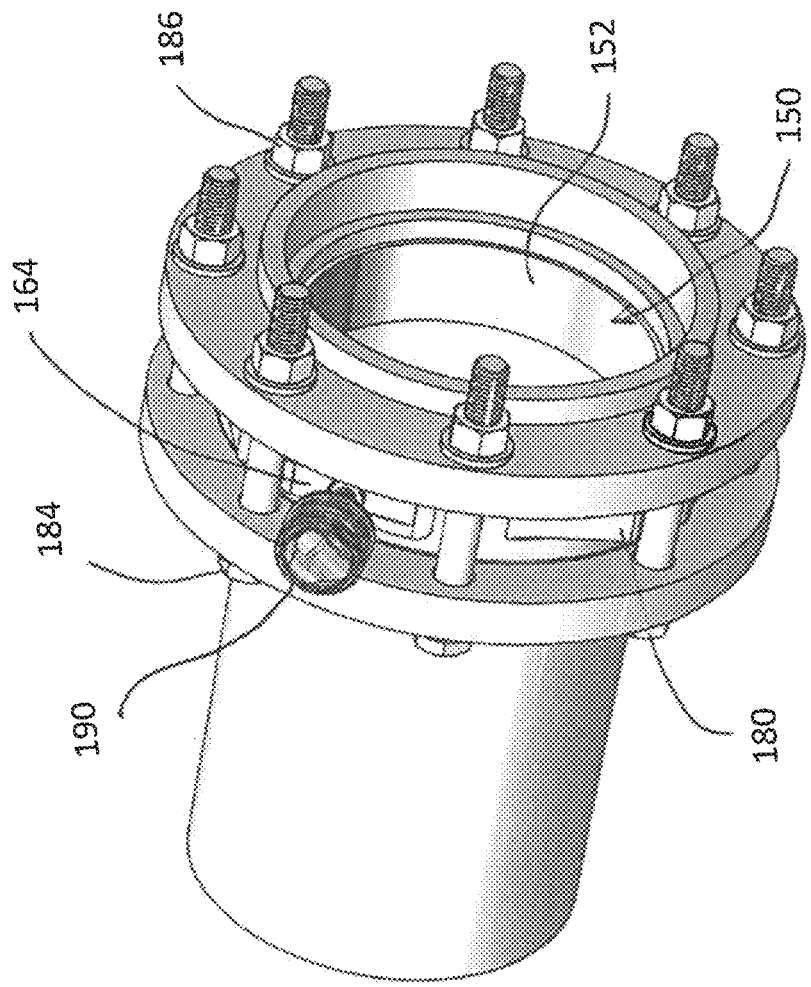
FIG. 8 is a perspective view of the exemplary pipe section of FIG. 4 mounted between two flanges.

FIG. 8 illustrates the pipe section 150 in another embodiment between two flanges that are mechanically coupled to one another by fasteners 184, 186. It should be appreciated that the pipe section 150 can be inserted at any flange joint and only requires a minimal additional flange gap (in some aspects approximately 2") and one additional gasket or seal (as appropriate). The inner liner 152 of the pipe section 150 may be sized to any industry standard piping sizes or may be customized to meet a user's desired specifications.

As shown in FIGS. 7 and 8, the inner liner 152 has an inside diameter selected to match the internal piping size of the suction and discharge pipes 110, 120 or any pipes to which the inner liner 152 is coupled. As best illustrated in FIGS. 5 and 6, the pressure transducer is flush mount so as not to restrict fluid flow or provide a potential contamination point. Referring to FIG. 5, there are no projections into the fluid flow path whatsoever. In some aspects, the pipe section 150 may be less intrusive than the pre-existing flange interface.

Figure 9:
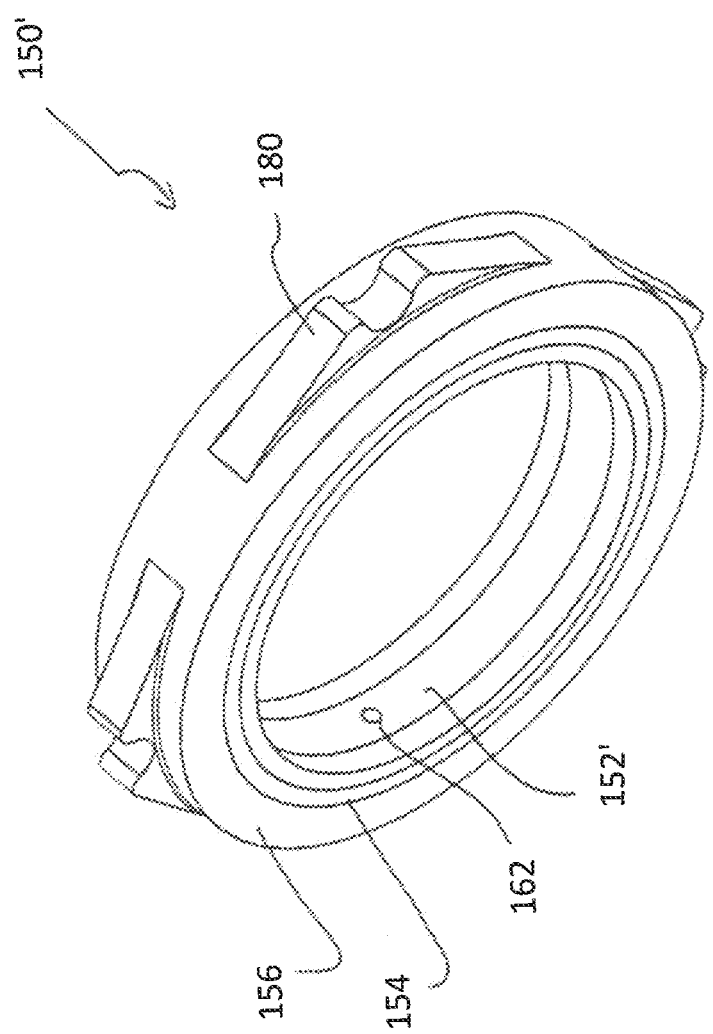
FIG. 9 is a perspective view of an exemplary pipe section having another embodiment of a temperature sensing pipe liner in accordance with various aspects of the disclosure.
Figure 10:
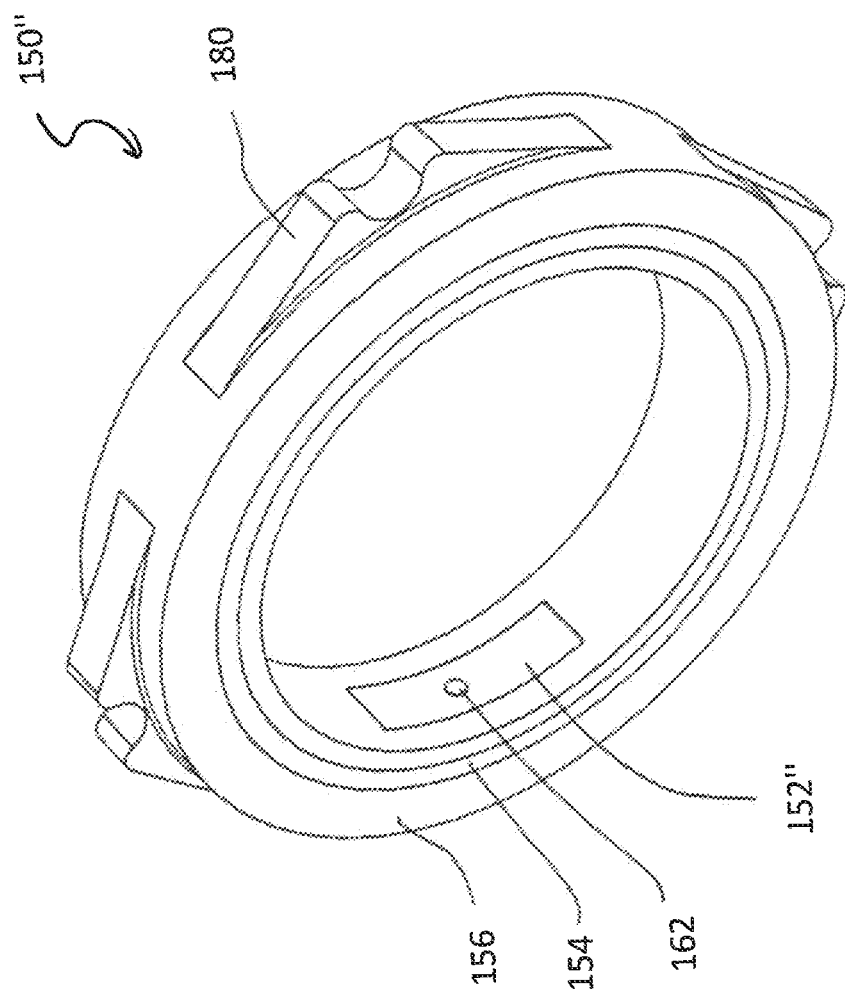
FIG. 10 is a perspective view of an exemplary pipe section having another embodiment of a temperature sensing pipe liner in accordance with various aspects of the disclosure.

Referring now to FIGS. 9 and 10, alternative embodiments of the pump section 150 are illustrated. In FIG. 9, the pump section 150' includes a temperature sensing pipe liner 152' that extends over only a portion of the inner surface of the pump section 150' in an axial flow direction. Meanwhile, in FIG. 10, the pump section 150" includes a temperature sensing pipe liner 152" that extends over only a portion of the inner surface of the pump section 150" in an axial flow direction and in a circumferential direction.

Accordingly, the exemplary pipe section 150 disclosed herein provides a temperature sensing pipe liner 152 that is non-invasive and, thus, does not influence or alter fluid flow therethrough. The temperature sensing pipe liner 152 can thus provide measurement within slurries, sludge, and, in general, flows containing mixed particulates. In some aspects, the inner liner 152 can be made of a material that is capable of providing measurements in flows containing highly corrosive fluids (e.g., acids) and highly abrasive fluids (e.g., sand slurries). In some aspects, inner liner 152 can be made of a material that is capable of providing measurements in flows that require hygienic surfaces, e.g., transporting food stuffs, pharmaceuticals, etc. In some aspects, the temperature transducer can provide more than a single point measurement, that is, by providing a distributed, temperature measurement averaged over the surface of the inner liner 152.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow

The invention claimed is:

1. A system for measuring pump efficiency, comprising:
 a pump configured to pump a fluid;
 a suction pipe disposed upstream of a suction side of the pump;
 a discharge pipe disposed downstream of a discharge side of the pump;
 a first pipe section disposed between the suction pipe and the suction side of the pump; and a second pipe section disposed between the discharge pipe and the discharge side of the pump, wherein each of the first pipe section and the second pipe section includes a temperature sensing pipe liner configured to measure a temperature of the fluid in the first pipe section, and a thermal insulator disposed radially outward of the temperature sensing pipe liner.

2. The system of claim 1, wherein each of the temperature sensing pipe liners includes a temperature transducer, and wherein each of the first pipe section and the second pipe section includes a pressure transducer and a communication interface.

3. The system of claim 2, wherein the temperature transducer is disposed on the temperature sensing liner to provide a spatially-averaged measure of a temperature of the temperature sensing liner.

4. The system of claim 2, wherein each of the temperature sensing pipe liners includes a plurality of temperature transducers.

5. The system of claim 1, wherein the temperature sensing liner is configured as an annular inner lining of a thin material having high thermal conductivity in the range of 100-200 W/mK such that the temperature sensing liner assumes the temperature of the fluid passing over the temperature sensing liner.

6. The system of claim 1, wherein the thermal insulator is an annular layer of a chemically inert, structurally stable material that has low thermal conductivity in the range of 10-20 W/mK.

7. The system of claim 2, wherein each of the first pipe section and the second pipe section includes a flange portion disposed radially outward relative to the thermal insulator.

8. The system of claim 7, wherein the temperature transducer and the pressure transducer are housed in an enclosure that is removably coupled with the flange portion.

9. The system of claim 8, wherein the temperature transducer and the pressure transducer are surrounded by fluid-tight, electrically and thermally isolating potting fill.

10. The system of claim 2, wherein the pressure transducer includes a threaded portion configured to be received by a threaded opening in the temperature sensing liner.

11. The system of claim 7, wherein the flange portion of the first pipe section is coupled with a flange of the suction pipe at the suction side of the pump, and the flange portion of the second pipe section is coupled with a flange of the discharge pipe at the discharge side of the pump.

12. The system of claim 2, wherein the pressure transducer includes a threaded portion configured to be received by a threaded opening in the temperature sensing liner.

13. The system of claim 1, wherein the temperature sensing liner of the first pipe section has an inside diameter that matches an internal piping size of the suction pipe, and wherein the temperature sensing liner of the second pipe section has an inside diameter that matches an internal piping size of the discharge pipe.

14. The system of claim 2, wherein the pressure transducer is flush mounted relative to the temperature sensing liner so as not to restrict fluid flow or provide a potential contamination point.

15. The system of claim 1, wherein the temperature sensing liner extends over only a portion of the inner surface of the first pipe section and/or the second pipe section in an axial flow direction.

16. The system of claim 1, wherein temperature sensing liner extends over only a portion of the inner surface of the first pipe section or the second pipe section in a circumferential direction.

17. A pipe section comprising:

a temperature sensing pipe liner configured to measure a temperature of the fluid in the pipe section; and a thermal insulator disposed radially outward of the temperature sensing pipe liner, wherein the pipe section includes a temperature transducer, a pressure transducer, and a communication interface, and wherein the temperature transducer is disposed on the temperature sensing liner to provide a spatially-averaged measure of a temperature of the temperature sensing liner.

18. The pipe section of claim 17, wherein the pipe section includes a plurality of temperature transducers.

19. A pipe section comprising:

a temperature sensing pipe liner configured to measure a temperature of the fluid in the pipe section; and a thermal insulator disposed radially outward of the temperature sensing pipe liner, wherein the temperature sensing liner is configured as an annular inner lining of a thin material having high thermal conductivity in the range of 100-200 W/mK such that the temperature sensing liner assumes the temperature of the fluid passing over the temperature sensing liner, and wherein the thermal insulator is an annular layer of a chemically inert, structurally stable material that has low thermal conductivity in the range of 10-20 W/mK.

20. A pipe section comprising:

a temperature sensing pipe liner disposed at an inner surface of the pipe section, the temperature sensing pipe liner being configured to measure a temperature of a fluid passing through the pipe section;

a thermal insulator disposed radially outward of the temperature sensing pipe liner:

wherein the pipe section includes a temperature transducer, a pressure transducer, and a communication interface, and wherein the temperature transducer is disposed on the temperature sensing liner to provide a spatially-averaged measure of a temperature of the temperature sensing liner.

21. The pipe section of claim 20, wherein the temperature sensing pipe liner is configured to assume the temperature of the fluid passing over it.

22. The pipe section of claim 20, wherein the temperature sensing pipe liner is configured to have a thermal conductivity in the range of 100-200 W/mK.

23. The pipe section of claim 20, further comprising a flange portion disposed radially outward of the thermal insulator.

24. The pipe section of claim 20, wherein the pipe section includes a plurality of temperature transducers.

25. The pipe section of claim 20, wherein the temperature sensing pipe liner is configured to extend over a portion of the inner surface in an axial flow direction through the pipe section.

26. The pipe section of claim 20, wherein the temperature sensing pipe liner is configured to extend over a portion of the inner surface in a circumferential of the pipe section.

27. The pipe section of claim 20, wherein pipe section is configured to be coupled between two pipes.

28. The pipe section of claim 27, wherein the temperature sensing pipe liner has an inside diameter that matches inside diameters of the two pipes to which the pipe section is coupled.

29. The pipe section of claim 27, wherein the temperature sensing pipe liner is configured so as to not restrict fluid flow through the two pipes and the pipe section.

\* \* \* \* \*